(12) United States Patent
Akaoka

(10) Patent No.: US 6,461,007 B1
(45) Date of Patent: Oct. 8, 2002

(54) SPREAD ILLUMINATING APPARATUS

(75) Inventor: Hiroki Akaoka, Iwata-gun (JP)

(73) Assignee: Mineba Co., Ltd., Kitasaku-Gun (JP)

( * ) Notice: Subject to any disclaimer, the term of this patent is extended or adjusted under 35 U.S.C. 154(b) by 0 days.

(21) Appl. No.: 10/059,393

(22) Filed: Jan. 31, 2002

(30) Foreign Application Priority Data

Jan. 31, 2001 (JP) .................................. 2001-023914

(51) Int. Cl.$^7$ ................................................ F21V 7/04
(52) U.S. Cl. ................. 362/31; 349/61; 362/26; 362/27; 362/29; 362/30; 385/31; 385/146; 385/147; 385/901
(58) Field of Search .................................. 362/31, 26, 27, 362/29; 349/61; 385/31, 146, 147, 901

(56) References Cited

U.S. PATENT DOCUMENTS 6,286,970 B1 * 9/2001 Egawa et al. .................. 362/31

* cited by examiner

Primary Examiner—William L. Sikes
Assistant Examiner—Thoi V. Duong
(74) Attorney, Agent, or Firm—Oliff & Berridge, PLC

(57) ABSTRACT

In a spread illuminating apparatus including a transparent substrate which has a light reflection pattern with grooves formed to be inclined with respect to an optical axis of a light source, an optical path conversion means comprising grooves and flat portions is formed on a side surface of a light conductive member, where the depth of the grooves increases in proportion to the increase in distance from either of spot-like light sources toward a deepest groove formed at a predetermined position. The deepest groove is formed at a position off the center of the light conductive member by a predetermined distance toward either of the spot-like light sources, whereby the distribution of the amount of light emitted from the light conductive member toward the transparent substrate can be appropriately modified so as to level off the unevenness in brightness on the screen.

1 Claim, 6 Drawing Sheets

DEEPEST GROOVE IS
DISPOSED AT CENTER

AMOUNTS OF LIGHT EMITTED FROM
LIGHT CONDUCTIVE MEMBER ARE
DISTRIBUTED IN A SYMMETRIC MANNER
WITH RESPECTIVE TO CENTER

SHALLOW GROOVE

LESS LIGHT REFLECTED

DEEP GROOVE

MORE LIGHT REFLECTED

DEEPEST GROOVE IS POSITIONED
CLOSER TO DARKER SIDE

SPREAD ILLUMINATING APPARATUS

BACKGROUND OF THE INVENTION

1. Field of the Invention

The present invention relates to a spread illuminating apparatus, and particularly to a spread illuminating apparatus used as an illuminating means for a liquid crystal display.

2. Description of the Related Art

A liquid crystal display characterized by its low profile, small occupied volume and light weight has been extensively used in electric products including mobile phones and personal computers, and the demand thereof has been increased. However, since a liquid crystal of the liquid crystal display does not emit light by itself, an illuminating means is needed besides the liquid crystal display when used in dark places where solar or room light is not satisfactorily available. Thus, this illuminating means is required to be compact in size and small in power consumption. In recent years, a thin plate-like spread illuminating apparatus of side light type is often applied.

FIG. 4 shows an embodiment of a conventional spread illuminating apparatus of side light type.

As shown in the figure, a spread illuminating apparatus 1' is generally composed of a transparent substrate 2 made of a light-transmissible material and a bar-like light source 5 disposed close to an end surface 8 of the transparent substrate 2. Light rays emitted from the light source 5 are introduced into the transparent substrate 2 to illuminate a liquid crystal display (not shown) disposed under the transparent substrate 2.

The light source 5 is composed of a bar-like light conductive member 3 made of a transparent material and at least one spot-like light source (for example, a light-emitting diode) 4a (4b) disposed facing one end 6 (7) of the light conductive member 3. The light conductive member 3 is provided with an optical path conversion means 12', which includes grooves shaped, for example, triangular in section and formed on a surface opposite to a surface 9 facing the end surface 8 of the transparent substrate 2 so as to allow light rays emitted from the spot-like light source 4 to be made incident on the end surface 8 of the transparent substrate 2 in a substantially uniform manner. The light conductive member 3 is disposed with the surface 9 facing the end surface 8 of the transparent substrate 2 at a predetermined distance therefrom.

A light reflection member (frame) 13 is provided around the light conductive member 3 so as to efficiently guide the light rays emitted from the spot-like light source 4a (4b) into the transparent substrate 2. The light reflection member 13 is substantially U-shaped, covers longitudinal surfaces of the light conductive member 3 except the surface 9 facing the transparent substrate 2 and is made of a hard resin having a metal (such as silver) vapor-deposited film, a white film, etc. stuck on a surface (an inner surface) facing the light conductive member 3, or made of a bent aluminum or stainless steel sheet.

A light reflection pattern 49 is formed on an upper surface 46 of the transparent substrate 2. The light reflection pattern 49 comprises grooves 47 shaped triangular in section and formed running parallel to the light conductive member 3 with predetermined intervals from each other and flat portions 48 present adjacent thereto. The grooves 47 are formed with respectively different depths so that light emitted from the light conductive member 3 is reflected in a substantially uniform manner everywhere at the surface of the transparent substrate 2 irrespective of the distance from the light conductive member 3 (the light source 5) thereby uniformly illuminating a liquid crystal display (not shown) provided under the transparent substrate 2. Specifically, the depth of the groove 47 increases gradually in proportion to the increase in distance from the light conductive member 3.

However, in an illuminating means using the light reflection pattern 49, when light is reflected at the light reflection pattern, interference fringes (moire pattern) caused by fringes due to the difference in transmissivity between the grooves 47 and the flat portions 48 and by an array of the mosaic pattern of liquid crystal cells constituting pixels of the liquid crystal display (liquid crystal display element) become conspicuous, thereby making the image difficult to observe. The generation of the moire pattern is related closely to the pattern shape of the light reflection pattern 49, i.e., the depth, size and interval of the grooves 47

The countermeasure against the moire pattern was disclosed in a publication (Monthly Display, April Issue, 2000) describing that the moire pattern is most effectively eliminated by forming the grooves with a predetermined inclination angle θ (θ=22.5°) against the longitudinal direction of the light conductive member. A spread illuminating apparatus based on the above configuration is shown in FIG. 5.

As shown in FIG. 5, a light reflection pattern 59 formed on an upper surface of the transparent substrate 2 comprises grooves 57 and flat portions 58 adjacent thereto, and the grooves 57 are formed inclinedly to have a predetermined inclination angle θ (preferably θ=22.5°) with respect to the optical axis of the bar-like light source 5.

However, a spread illuminating apparatus 1" in FIG. 5 has the following problems though it comes up with a countermeasure effective against the moire pattern.

The transparent substrate 2 suffers a reflective image of the spot-like light source 4a due to the inclination of the grooves 57 as well as the position of the spot-like light source 4a on an end surface 6 of the light conductive member 3, whereby a strip-shaped bright line 51 is generated crossing the grooves 57 from one end surface 8 of the transparent substrate 2 toward another end surface 18 opposite to the end surface 8. Specifically, a dark area A defined by the bright line 51, a side surface 52, and the end surface 18 appears on the surface of the transparent substrate 2 and makes itself conspicuous especially against the bright line 51, thereby degrading the illumination quality. Here, the reflective image of the spot-like light source 4a in the transparent substrate 2 refers to the phenomenon in which the stripe-like bright line 51 is observed in the transparent substrate 2 when observed from a viewing surface (upper surface) due to the fact that light emitted from the spot-like light source 4 is introduced into the transparent substrate 2 in a stripe via the end surface 6 of the light conductive member 3.

This occurs, because the grooves 57 are formed so as to have the inclination angle θ as shown in FIG. 5, and thus light from the light source 5 is scarcely guided to the grooves 57 located in the area A, and also because the grooves 57 are inclined so as to gradually get closer to the end surface 8 of the transparent substrate 2 from one side surface 52 of the transparent substrate 2 toward another side surface 53 and have their depths gradually increased in proportion to the increase in distance from the end surface 8 while one groove has a constant depth all the way, and thus the light introduced into the transparent substrate 2 is reflected in a smaller amount at the grooves positioned toward the side surface 52 of the transparent substrate 2 than at the grooves positioned toward the side surface 53 thereby providing the area A with low brightness and an area B with high brightness.

SUMMARY OF THE INVENTION

The present invention has been made in light of the above problems, and the object of the present invention is to provide a spread illuminating apparatus which can suppress the generation of the moire pattern and bright line and ensure uniform brightness over the whole screen.

In order to solve the above problems, according the present invention, in a spread illuminating apparatus which comprises: a transparent substrate made of a light-transmissible material; and a light source comprising a bar-like light conductive member and spot-like light sources disposed on both ends of the light conductive member and disposed along and close to an end surface of the transparent substrate; in which an optical path conversion means comprising a plurality of grooves and a plurality of flat portions adjacent thereto is provided on a side surface of the light conductive member; the depth of the grooves increases in proportion to the increase in distance from each of the spot-like light sources and keeps increasing up to a predetermined position where a deepest groove is formed; and in which a light reflection pattern comprising a plurality of grooves and a plurality of flat portions adjacent thereto is formed on the transparent substrate with the grooves having a predetermined angle with respect to the optical axis of the light source; the predetermined position of the deepest groove is shifted from the center of the light conductive member toward either of the spot-like light sources.

Light rays emitted from the spot-like light sources disposed on both ends of the light conductive member are introduced into the light conductive member, reflected at inclined surfaces of the grooves and at the flat portions constituting the optical path conversion means, and guided into the transparent substrate. With the deepest groove positioned off the center of the light conductive member as described above, the intensity of the light rays guided into the transparent substrate from the light conductive member is not symmetric with respect to the center of the light conductive member, thereby leveling off the unevenness in brightness (difference in brightness) conventionally having appeared on the transparent substrate.

Generation of moire pattern can be held by structuring the light reflection pattern such that its grooves are formed to have a predetermined inclination angle with respect to the optical axis of the light source, and the unevenness in brightness, which occurs on the transparent substrate due to the above described structure of the light reflection pattern, can be significantly diminished by shifting the position of the deepest groove off the center of the light conductive member.

BRIEF DESCRIPTION OF THE DRAWINGS

FIG. 3A shows areas on the transparent substrate where the brightness is measured;

FIG. 3B is a graph showing the relationship between the position of the deepest groove and the brightness at areas 1 to 3;

FIG. 3C is a graph showing the relationship between the position of the deepest groove and the brightness at areas 4 to 6;

FIG. 3D is a graph showing the relationship between the position of the deepest groove and the brightness at areas 7 to 9;

DESCRIPTION OF THE PREFERRED EMBODIMENTS

Preferred embodiments of the spread illuminating apparatus in accordance with the present invention are hereinafter explained with reference to the attached drawings. The present invention is concerned with an improvement of a light source in a conventional spread illuminating apparatus, and parts and components identical with or equivalent to those of the conventional spread illuminating apparatus are indicated by the same references and a detailed description thereof is omitted.

Figure 1:
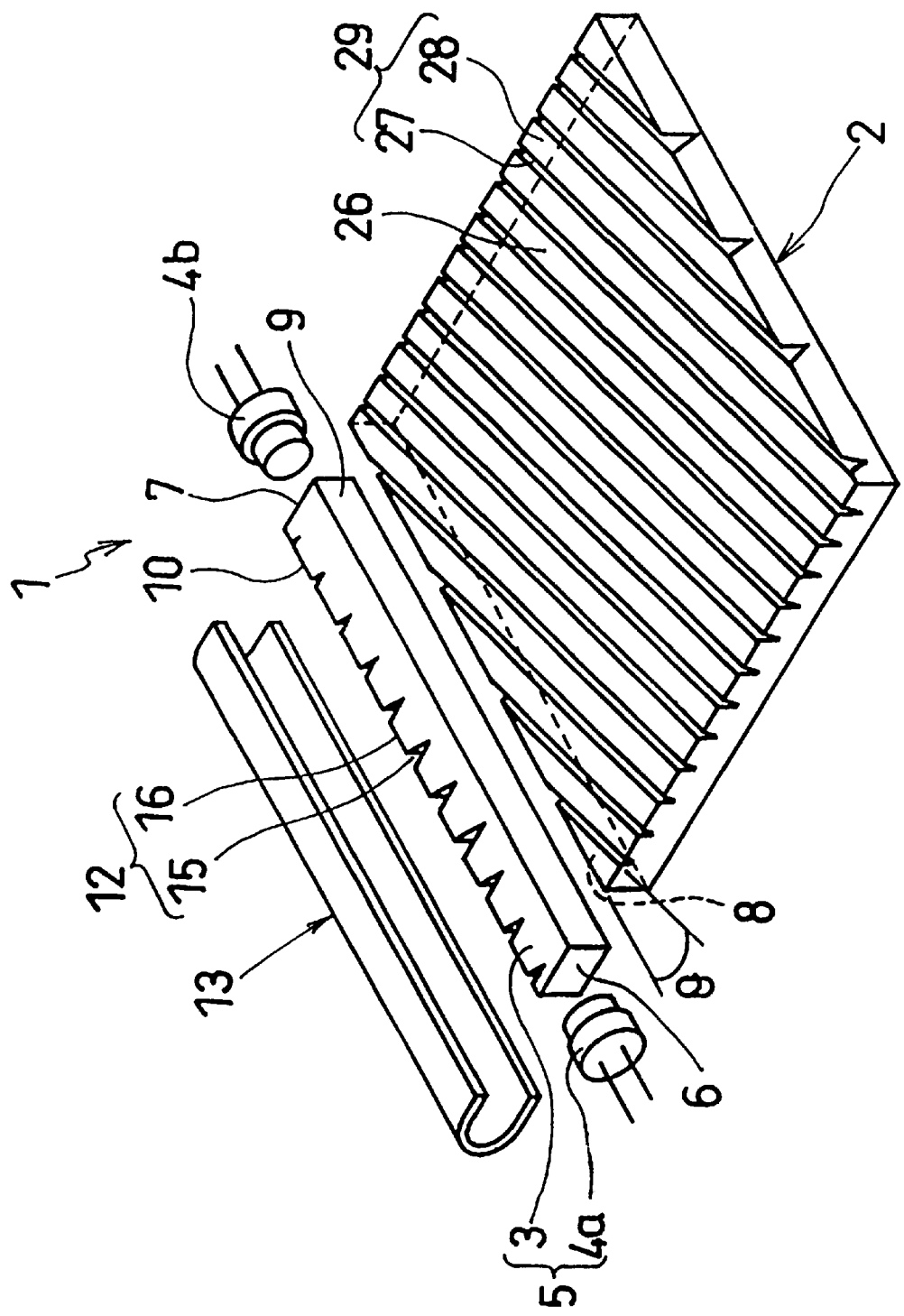
FIG. 1 is an exploded perspective view of an embodiment of a spread illuminating apparatus in accordance with the present invention.

FIG. 1 is an exploded perspective view of an embodiment of the spread illuminating apparatus in accordance with the present invention. As shown in the figure, a spread illuminating apparatus 1 is generally composed of a transparent substrate 2, a light source 5 disposed along one end surface 8 of the transparent substrate 2 and a light reflection member (frame) 13.

The light source 5 comprises a bar-like light conductive member 3 and spot-like light sources 4a and 4b. An optical path conversion means 12 is formed on a surface 10 of the light conductive member 3 opposite to a surface 9 facing the end surface 8 of the transparent substrate 2. The optical path conversion means 12 comprises grooves 15 triangular in section and flat portions 16 adjacent thereto, and any two adjacent grooves have respective depths different from each other. The spot-like light sources 4a and 4b are disposed close to end surfaces 6 and 7 of the light conductive member 3, respectively. The light reflection member 13 is disposed so as to cover the light conductive member 3 when the spread illuminating apparatus 1 is assembled.

A light reflection pattern 29 is formed on an upper surface (surface on the viewing side) 26 of the transparent substrate 2 so as to uniformly spread light, which is introduced into the transparent substrate via the end surface 8, toward a liquid crystal display (not shown) from the whole of a lower surface of the transparent substrate 2. The light reflection pattern 29 comprises grooves 27 substantially triangle in section and flat portions 28 adjacent thereto, and is oriented to have a predetermined inclination angle of θ with respect to the optical axis of the light source 5 (also referred to as the optical axis of the light conductive member 3). Interference fringes, i.e., moire pattern, caused by bright and dark stripes due to the light reflection pattern and array of the mosaic pattern of liquid crystal cells, can be held down with this predetermined inclination angle of θ, which can happen effectively when the inclination angle θ is set to be between 10° and 35°, and most effectively and optimally when θ=22.5°.

The grooves are formed with a regular interval, whereas the depths of the grooves increase in proportion to the increase in distance from the end surface 8 of the transparent substrate 2. Thus, substantially uniform brightness can be realized on the transparent substrate 2 irrespective of the distance from the light conductive member 3.

Figure 2A:
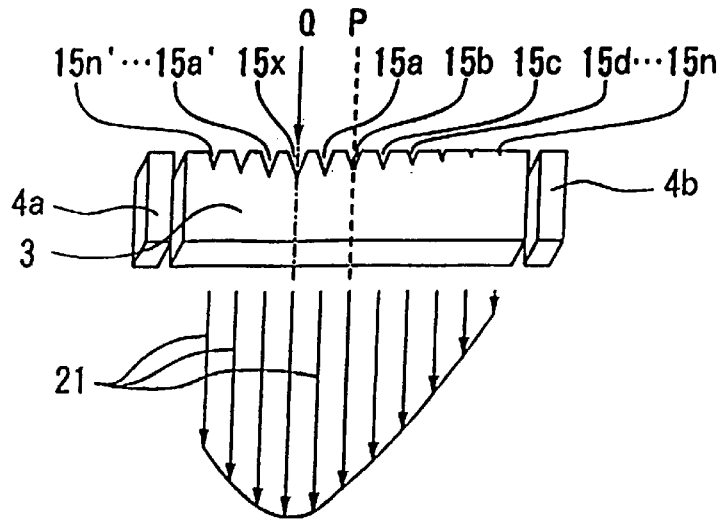
FIG. 2A shows an embodiment of an optical path conversion means formed on a light conductive member of a spread illuminating apparatus in accordance with the present invention.
Figure 2B:
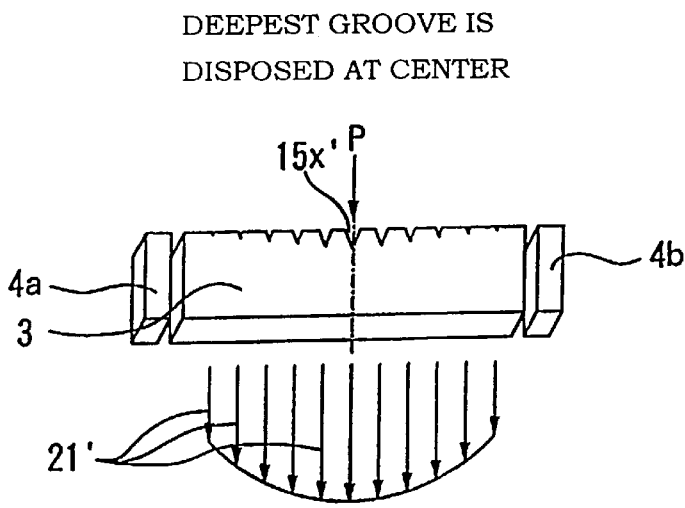
FIG. 2B shows an embodiment of an optical path conversion means formed on a conventional light conductive member.

FIG. 2A shows an embodiment of the optical path conversion means in accordance with the present invention, and FIG. 2B shows an embodiment of a conventional optical path conversion means.

Figure 2C:
FIG. 2C is a schematic representation of light progress at a shallow groove of the optical path conversion means.
Figure 2D:
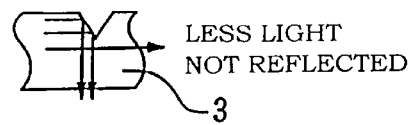
FIG. 2D is a schematic representation of light progress at a deep groove of the optical path conversion means.

As shown in FIG. 2B, the conventional optical path conversion means formed on one surface of the light conductive member 3 comprises grooves triangular in section and flat portions adjacent thereto. A deepest groove 15X' is formed at the center (position P) of the light conductive member 3, and the depth of the grooves decreases gradually from the position P toward the spot-like light sources 4a and 4b, respectively. The length of arrows 21' indicates the amount of light reflected at the grooves and emitted toward the transparent substrate (not shown) and the longest arrow means the largest amount of reflected light The amount of light emitted from the light conductive member 3 toward the transparent substrate may vary according to the depth of the grooves. At a groove with a smaller depth, a smaller amount of light is reflected toward the transparent substrate and a larger amount of light keeps traveling in the light conductive member 3, whereby the amount of light emitted toward the transparent substrate is decreased (refer to FIG. 2C). At a groove with a larger depth, a larger amount of light is reflected toward the transparent substrate and a smaller amount of light keeps traveling in the light conductive member 3, whereby the amount of light emitted toward the transparent substrate is increased (refer to FIG. 2D).

In the conventional optical path conversion means, the grooves are formed so that the amounts of light reflected at the grooves are distributed symmetrically with respect to the position P of the light conductive member as shown in the figure, whereby the intensity of light emitted from the light conductive member is adapted to be uniform irrespective of the distance from the respective spot-like light sources.

On the other hand, as shown in FIG. 2A, the optical path conversion means in accordance with the present invention comprises grooves triangular in section and flat portions adjacent thereto, with the grooves varying in depth from each other similar to a conventional configuration but with a difference in that a deepest groove 15X is formed at a position Q off the center of the light conductive member 3 toward either of the spot-like light sources (shifted toward the spot-like light source 4a in this embodiment). The configuration of the present embodiment is similar to the conventional configuration in that the grooves decrease in depth from the deepest groove toward the respective spot-like light sources. However, the position Q at which the deepest groove 15X is formed is deviated from the position P, i.e., the center of the light conductive member 3 toward the spot-like light source 4a, and thus, the number of the grooves formed between the deepest groove 15X and the spot-like light source 4a is different from the number of the grooves formed between the deepest groove 15X and the spot-like light source 4b, and further, the depth of a groove 15n' positioned closest to the spot-like light source 4a is different from the depth of a groove 15n positioned closest to the spot-like light source 4b. Thus, the amounts of light emitted from the light conductive member 3 toward the transparent substrate, i.e., the lengths of the arrows 21, are not distributed symmetrically with respect to the position P of the light conductive member 3. The longest arrow corresponding to the position Q at which the deepest groove 15X is formed is shifted off the center of the light conductive member 3 toward the spot-like light source 4a.

Figure 5:
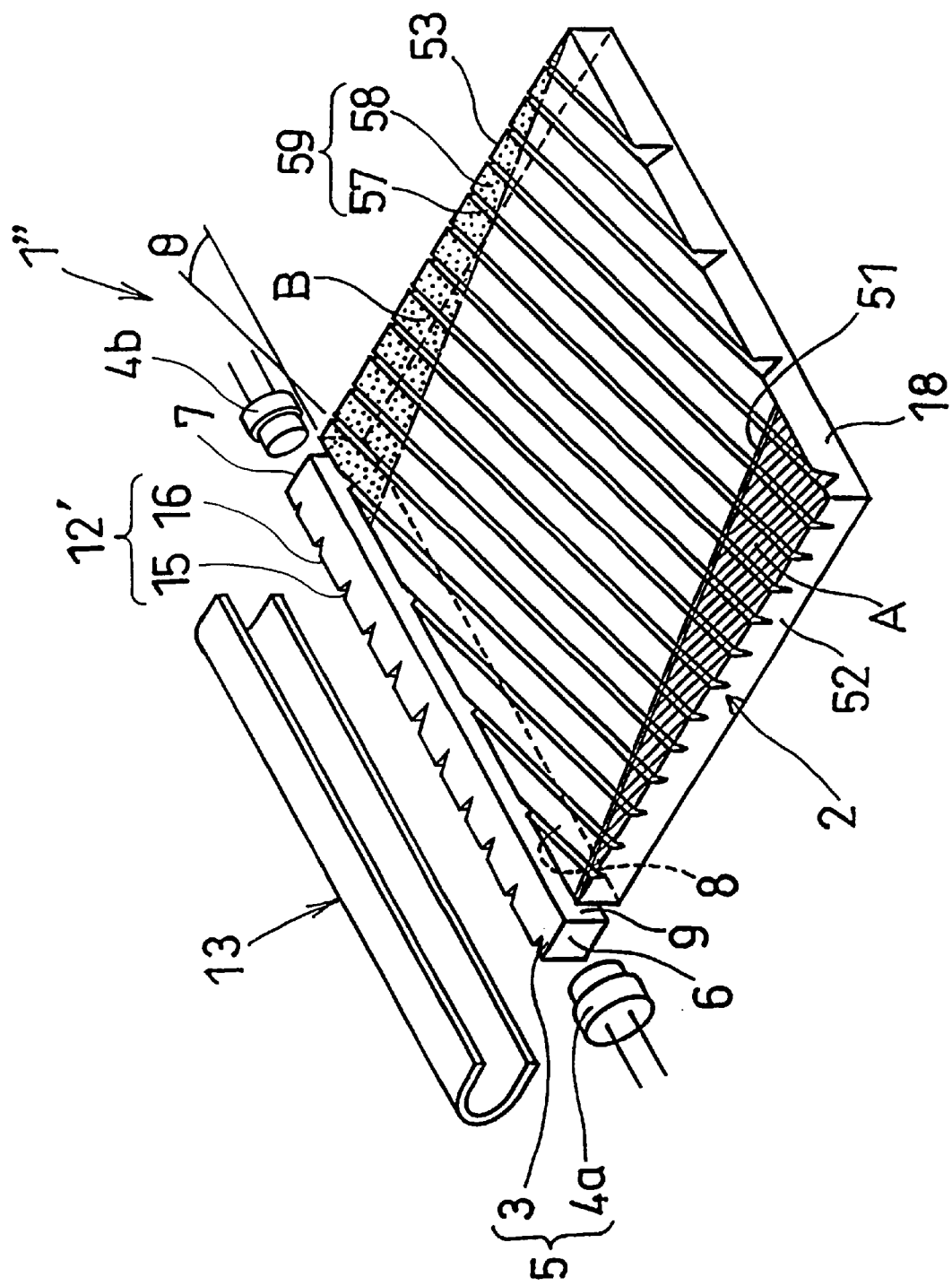
FIG. 5 is an exploded perspective view of another embodiment of a conventional spread illuminating apparatus.

Thus, the deepest groove is positioned off the center of the light conductive member so as to modify the distribution of the amount of light emitted from the light conductive member toward the transparent substrate, whereby the unevenness in brightness (the area A with low brightness and the area B with high brightness as shown in FIG. 5) can be lessened or eliminated, which emerges in the transparent substrate when the transparent substrate is provided with the light reflection pattern having the grooves formed with a predetermined inclination angle. The result of the lessened or eliminated unevenness in brightness will be described hereinlater.

The optical path conversion means is not limited to the above configuration. For example, it may comprise grooves trapezoidal in section and flat portions adjacent thereto, or may comprise only grooves substantially triangular in section without flat portions.

EXAMPLE

The result of measurement of the brightness on the transparent substrate 2 is shown below where the position of the deepest groove of the optical path conversion means 12 formed on the light conductive member 3 in the spread illuminating apparatus 1 shown in FIG. 1 is arbitrarily changed.

Figure 3A:
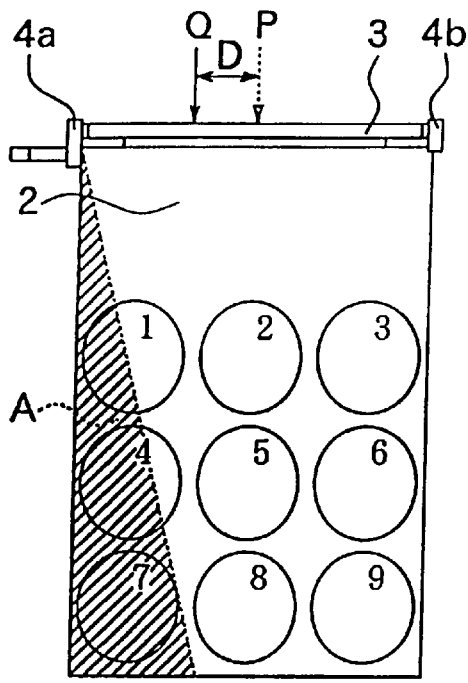
FIGS. 3A to 3D are a schematic representation and graphs showing the relationship between the position of a deepest groove on the optical path conversion means and the brightness on the transparent substrate in the spread illuminating apparatus in accordance with the present invention.
Figure 3B:
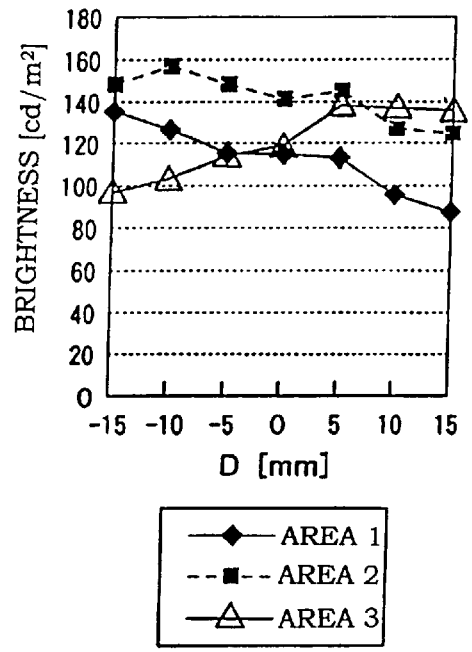
Figure 3C:
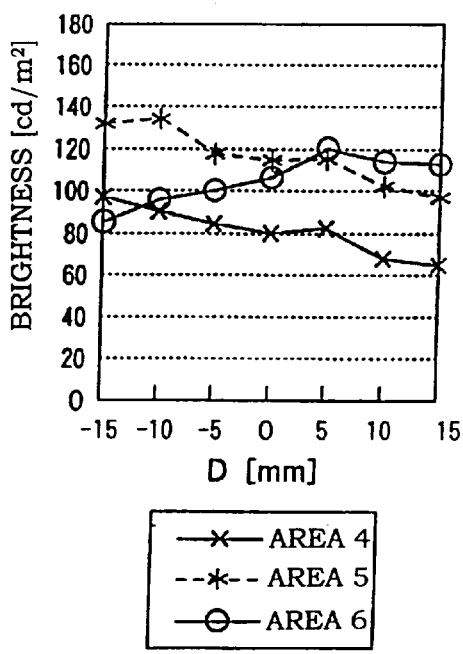
Figure 3D:
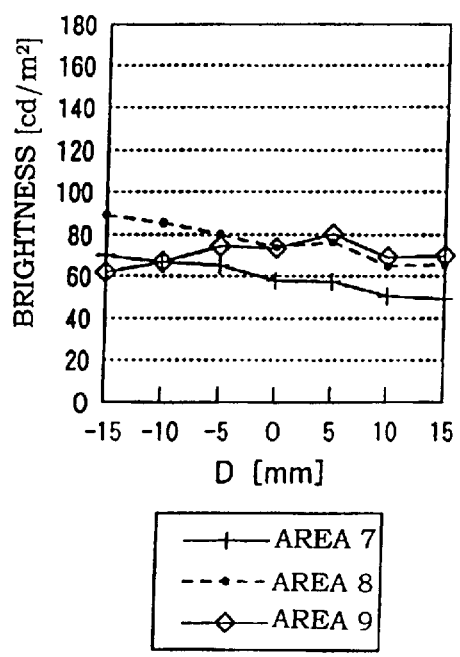
Figure 4:
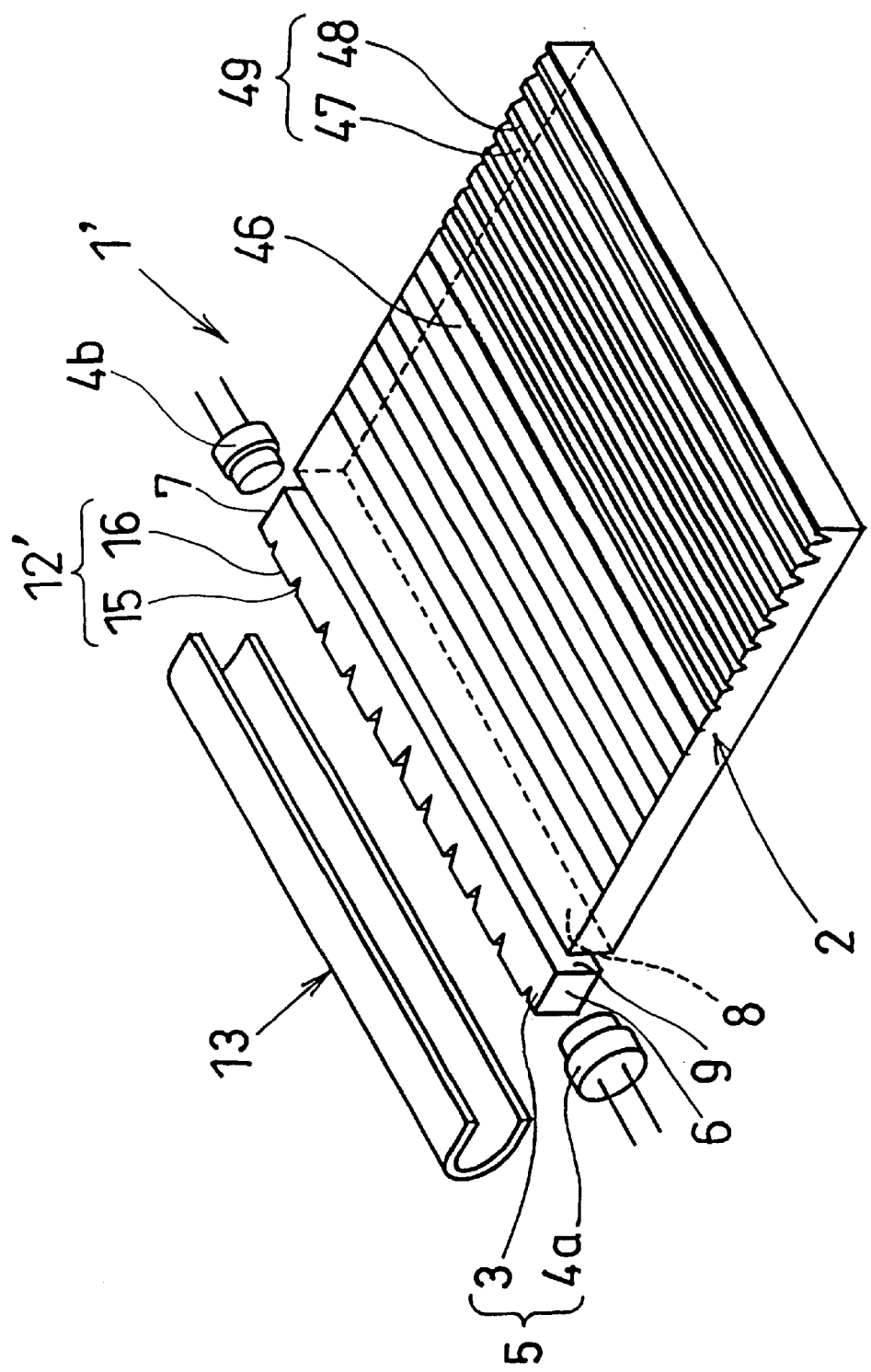
FIG. 4 is an exploded perspective view of an embodiment of a conventional spread illuminating apparatus.

FIGS. 3 to 3D are a schematic representation and graphs showing the relationship between the position of the deepest groove of the optical path conversion means and the brightness on the transparent substrate.

FIG. 3A is a top plan view of the spread illuminating apparatus 1, where the brightness on the transparent substrate 2 was measured in the areas circled and numbered 1 to 9. The light reflection pattern with grooves having the inclination angle θ with respect to the longitudinal direction of the light conductive member 3 is formed on the transparent substrate 2 though not shown in the figure. The position P is the center of the light conductive member 3, and the position Q is where the deepest groove of the optical path conversion means 12 is formed. D denotes the distance (deviation) from the position P to the position Q. The shaded area A shows the area suffering lower brightness generated in the conventional spread illuminating apparatus 1" (FIG. 5).

FIG. 3B is a graph showing the brightness in the areas 1 to 3 in the spread illuminating apparatus 1, and the X-axis shows the position of the deepest groove in terms of the deviation D. Here, D=0 means that the deepest groove is formed at the center (the position P) of the light conductive member, and D=−5 means that the deepest groove is formed off the position P by 5 mm toward the spot-like light source 4a.

As shown in the graph, when the deepest groove is formed at the position P, the brightness in the area 1 is lower than the brightness in the area 3, while the brightness in the area 1 can be substantially the same as the brightness in the area 3 when the position of the deepest groove is shifted toward the spot-like light source 4a by 5 mm. The brightness in the area 1 can be higher than the brightness of the area 3 when the position of the deepest groove is further shifted toward the spot-like light source 4a. From the above findings, the unevenness in brightness (degradation of the brightness in the area A) suffered in the conventional spread illuminating apparatus 1" can be lessened or eliminated by shifting the position of the deepest groove from the position P toward the spot-like light source 4a. When the position of the deepest groove is shifted from the position P toward the spot-like light source 4b, the difference in brightness between the area 1 and the area 3 is increased.

FIG. 3C is a graph showing the brightness in the areas 4 to 6 in the spread illuminating apparatus 1. As shown in the graph, when the deepest groove is formed at the position P, the brightness in the area 4 is lower than the brightness in the area 6 or the area 5, while the brightness in the area 4 can be substantially the same as the brightness in the area 6 when the position of the deepest groove is shifted toward the spot-like light source 4a by 10 to 15 mm. In conclusion, the unevenness in brightness (degradation of the brightness in the area A) suffered in the conventional spread illuminating apparatus 1" can be lessened or eliminated by shifting the position of the deepest groove from the position P toward the spot-like light source 4a. The difference in brightness between the area 4 and the area 6 is increased when the position of the deepest groove is shifted from the position P toward the spot-like light source 4b.

FIG. 3D is a graph showing the brightness in the areas 7 to 9 in the spread illuminating apparatus 1. As shown in the graph, when the deepest groove is formed at the position P, the brightness in the area 7 is lower than the brightness in the area 9 or the area 8, while the brightness in the area 7 can be substantially the same as the brightness in the area 9 when the position of the deepest groove is shifted toward the spot-like light source 4a by 10 mm. In conclusion, the unevenness in brightness (degradation of the brightness in the area A) suffered in the conventional spread illuminating apparatus 1" can be lessened or eliminated by shifting the position of the deepest groove from the position P toward the spot-like light source 4a. The difference in brightness between the area 7 and the area 9 is increased when the position of the deepest groove is shifted from the position P toward the spot-like light source 4b.

In the spread illuminating apparatus in accordance with the present invention, the position of the deepest groove of the optical path conversion means formed on the side surface of the light conductive member having a spot-like light source on each of both ends thereof is shifted from the center of the light conductive member toward either of the spot-like light source, whereby the position at which the largest amount of light is reflected toward the transparent substrate can be shifted off the center. Thus, more intensive light can be directed to the area with low brightness by disposing the deepest groove of the optical path conversion means at a position corresponding to the area with low brightness on the transparent substrate, and the difference in brightness (the uneven brightness) appearing on a viewing screen can be lessened.

Generation of the uneven brightness and bright line as well as moire pattern can be held down by disposing the deepest groove of the optical path conversion means at the position corresponding to the area with lower brightness on the transparent substrate which is provided with a light reflection pattern with grooves having a predetermined inclination angle with respect to the optical axis of the light source, whereby the uniformity in brightness can be improved over the whole viewing screen.

In addition, since the uneven brightness and bright line resulting from the inclined grooves of the light reflection pattern can be solved without providing an additional light source, the spread illuminating apparatus can stay downsized.

What is claimed is:

1. A spread illuminating apparatus comprising:

a transparent substrate formed of a light-transmissible material; and a light source comprising a bar-like light conductive member and spot-like light sources disposed on both ends of said light conductive member and disposed along and close to an end surface of said transparent substrate;

in which an optical path conversion means comprising a plurality of grooves and a plurality of flat portions adjacent to said grooves is formed on a side surface of said light conductive member;

in which a depth of said grooves increases in proportion to an increase in distance from each of said spot-like light sources toward a predetermined position where a deepest groove is formed; and in which a light reflection pattern comprising a plurality of grooves and a plurality of flat portions adjacent to said grooves is formed on an upper surface of said transparent substrate with said plurality of grooves oriented to have a predetermined inclination angle with respect to an optical axis of said light source, characterized in that said predetermined position of said deepest groove is shifted from a center of said light conductive member toward either of said spot-like light sources.

* * * * *

UNITED STATES PATENT AND TRADEMARK OFFICE
CERTIFICATE OF CORRECTION

PATENT NO. : 6,461,007 B1
DATED : October 8, 2002
INVENTOR(S) : Hiroki Akaoka

It is certified that error appears in the above-identified patent and that said Letters Patent is hereby corrected as shown below:

<u>Title page,</u>
Item [10], Patent No.: change "US 6,461,007 B1" to -- US 6,461,007 B2 --
Item [73], Assignee, change "Mineba Co., Ltd., Kitasaku-Gun (JP)" to
-- Minebea Co., Ltd., Kitasaku-Gun (JP) --.

Signed and Sealed this

Eighteenth Day of February, 2003

JAMES E. ROGAN
*Director of the United States Patent and Trademark Office*